US010165559B2

(12) United States Patent
Werner et al.

(10) Patent No.: US 10,165,559 B2
(45) Date of Patent: Dec. 25, 2018

(54) METHOD FOR DETECTION OF EPDCCH USING DMRS QUALITY MEASURE

(71) Applicant: Telefonaktiebolaget LM Ericsson (publ), Stockholm (SE)

(72) Inventors: Karl Werner, Segeltorp (SE); Henrik Sahlin, Mölnlycke (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 228 days.

(21) Appl. No.: 15/021,397

(22) PCT Filed: Sep. 13, 2013

(86) PCT No.: PCT/SE2013/051070
§ 371 (c)(1),
(2) Date: Mar. 11, 2016

(87) PCT Pub. No.: WO2015/038043
PCT Pub. Date: Mar. 19, 2015

(65) Prior Publication Data
US 2016/0227525 A1 Aug. 4, 2016

(51) Int. Cl.
| *H04J 11/00* | (2006.01) |
| *H04W 72/04* | (2009.01) |
| *H04L 1/00* | (2006.01) |
| *H04L 5/00* | (2006.01) |

(Continued)

(52) U.S. Cl.
CPC ............ *H04W 72/042* (2013.01); *H04L 1/00* (2013.01); *H04L 5/00* (2013.01); *H04L 25/02* (2013.01); *H04L 25/0224* (2013.01); *H04L 25/0232* (2013.01); *H04W 72/085* (2013.01); *H04L 5/0051* (2013.01); *H04L 5/0053* (2013.01)

(58) Field of Classification Search
CPC ............ H04L 25/0224; H04L 25/0228; H04L 27/261; H04L 27/2611; H04J 11/0079
See application file for complete search history.

(56) References Cited

U.S. PATENT DOCUMENTS

| 2005/0111596 A1* | 5/2005 | Olsson ............... H04B 1/1027 375/346 |
| 2011/0075708 A1* | 3/2011 | Hahm ............... H04B 1/71072 375/144 |

FOREIGN PATENT DOCUMENTS

WO 2013104425 A1 7/2013

OTHER PUBLICATIONS

Huawei, Hisilicon, "DMRS sequences for ePDCCH" In: 3GGP TSG RAN WG1 meeting #68, Dresden, Germany, Feb. 6-10, 2012, R1-120870, 3rd Generation Partnership Project (3GPP), Mobile Competence Centre, 650 route des Lucioles, F-06921 Sophia-Antipolis Cedex, France, Feb. 13, 2012, 8 pages, XP050563409.

(Continued)

*Primary Examiner* — Andrew W Chriss
*Assistant Examiner* — Kenan Cehic
(74) *Attorney, Agent, or Firm* — Sage Patent Group

(57) ABSTRACT

The present invention relates to a receiver circuitry and an evaluation method in a receiver circuitry for controlling a decoding of a plurality of control channel message candidates by selecting control channel message candidates based on a quality measure control channel message candidates for decoding of a received control channel message (S150). The quality measure is computed for a DMRS candidate based on an extracted signal sequence and a calculated DMRS sequence (S140).

14 Claims, 11 Drawing Sheets

(51) Int. Cl.
    *H04L 25/02*    (2006.01)
    *H04W 72/08*    (2009.01)

(56) References Cited

OTHER PUBLICATIONS

Draft 3GPP TS 36.211 V11.20, 3rd Generation Partnership Project; Technical Sepcification Group Radio Access Network; Evolved Universal Terrestrial Radio Access (E-UTRA); Physical Channels and Modulation (Release 11), 2013, 110 pages.
European Office Action issued in Application No. 13893552.3 by European Patent Office, dated Aug. 10, 2016, 6 pages.
Huawei, Hisilicon, "Usage of ePDCCH signature for ePDCCH detection" In: 3GPP TSG RAN WG1 meeting #68bis, Jeju, Korea, Mar. 26-30, 2012, R1-120994, 3 pages.

* cited by examiner

METHOD FOR DETECTION OF EPDCCH USING DMRS QUALITY MEASURE

CROSS-REFERENCE TO RELATED APPLICATION

This application is a 35 U.S.C. § 371 National Phase Entry Application from PCT/SE2013/051070, filed Sep. 13, 2013, and designating the United States.

TECHNICAL FIELD

The following disclosure refers to receiving circuitry and methods in receiving circuitry.

BACKGROUND

The enhanced physical downlink control channel (ePDCCH) is a new control channel from 3GPP standard release 11 within the development of the Long Term Evolution (LTE).

A UE is configured with two sets of ePDCCH parameters, each of these sets define a number of hypothesis, control channel message candidates, that the UE must test using blind decodes. Among these parameters are indices to PRBs that the UE should search for ePDCCH in. Other parameters define reference signal sequence.

As illustrated in FIG. 2, ePDCCH is frequency-multiplexed with the Physical Downlink Shared Channel (PDSCH), and the ePDCCH spans both slots in a sub-frame. This means that the whole sub-frame has to be received before the decoding the ePDCCH is possible to perform. The ePDCCH is transmitted in a similar way as PDSCH in transmission mode 9 and 10, i.e. the reception of a message is based on the reception of a demodulation reference signal, DMRS.

Implementing ePDCCH requires a large number of blind decodes in a tight latency budget. The legacy control channel, physical downlink control channel (PDCCH), imposes less tight latency requirements.

If a downlink transport block is scheduled using ePDCCH, decoding of it cannot begin until ePDCCH is decoded. In order to meet the tight latency requirements of the standard it is hence critical that decoding of ePDCCH is as fast as possible.

Decoding of ePDCCH requires testing of several candidates of a large number of parameters. Testing of such a candidates is called a "blind decode". A UE is required to test up to 32 such blind decodes. Typically a UE will test several hypotheses prior to finding a valid ePDCCH. Even if a valid ePDCCH is detected in a blind decode, UE might be required to continue testing other blind decodes. This is because several ePDCCH might be sent to a given UE in any subframe.

The large number of blind decodes incur an excessive cost in terms of decoding hardware. Also, fewer OFDM symbols of a subframe are needed for PDCCH as compared to ePDCCH such that the UE can enter a power saving mode more often for PDCCH as compared to ePDCCH.

If a demodulation reference signal sequence that the UE is configured to use according to its configured parameter sets is not actually transmitted, the UE will still produce channel estimates, but decoding in subsequent steps will fail. This may be the case if ePDCCH for the UE in question is transmitted using parameters corresponding to another parameter set, or there is no ePDCCH transmitted to the UE in question in this subframe, and there are no other UEs, that have an ePDCCH transmissions in that subframe with the same parameters.

SUMMARY

The problem to be solved is to reduce the number of blind decodes to be tested in the blind decode processing.

The following disclosure provides a method, a receiving circuitry and embodiments thereof for solving said problem.

The method is performed in a receiver circuitry which is adapted to receive from a wireless network system demodulation reference signals, DMRS, and encoded control channel messages mapped to a plurality of physical resource blocks, PRBs. The receiver circuitry is configured to evaluate a plurality of control channel message candidates. Each control channel message candidate is associated with one DMRS candidate of a set of DMRS candidates. A DMRS candidate comprises a plurality of physical PRB indicators and one DMRS sequence identifier. The method comprises the receiving of a signal from the wireless network system, and calculating a DMRS sequence based on the DMRS sequence identifier of a first DMRS candidate. The method further comprises the extracting of a signal sequence from the received signal using the plurality of PRB indicators of the first DMRS candidate, and computing one first quality measure for the first demodulation reference signal candidate based on the extracted signal sequence and the calculated demodulation reference signal sequence, and then controlling a decoding of the plurality of control channel message candidates by selecting based on said first quality measure at least one control channel message candidate for decoding of a received control channel message.

Further one method and embodiments thereof are provided for solving the problem. The method is adapted to be performed in a receiver circuitry, which is adapted to receive signals from a wireless network system, where these signals include demodulation reference signals, DMRS, and encoded control channel messages mapped to a plurality of physical resource blocks, PRBs. The method comprises an evaluation of a plurality of control channel message candidates. Each control channel message candidate is associated with one DMRS candidate of a set of DMRS candidates. A DMRS candidate comprises a plurality of PRB indicators and one DMRS identifier. The method comprises the receiving of a signal from the wireless network system, and calculating a DMRS sequence based on the DMRS sequence identifier of a first DMRS candidate. The method further comprises extracting a signal sequence from the received signal using the plurality of PRB indicators of the first DMRS candidate, and computing one first quality measure for the first DMRS candidate based on the extracted signal sequence and the calculated DMRS sequence. The method further involves controlling of a decoding of the plurality of control channel message candidates comprising comparing the first quality measure with a pre-set threshold value for determining if a threshold criterion is fulfilled, and selecting the control channel message candidates associated with the demodulation reference signal candidate or candidates for the evaluation for which the threshold criterion is fulfilled.

Further one aspect of a solution to the stated problem is a receiving circuitry and embodiments thereof. The receiving circuitry is adapted to receive from a wireless network system demodulation reference signals, DMRS, and encoded control channel messages mapped to a plurality of physical resource blocks, PRBs. The receiving circuitry is configured to evaluate a plurality of control channel message candidates. Each control channel message candidate is associated with one DMRS candidate of a set of DMRS candidates. A DMRS candidate comprises a plurality of PRB indicators and one DMRS sequence identifier. The receiving circuitry is configured to receive a signal from the wireless network system. The receiving circuitry further comprises a calculator configured to calculate a DMRS sequence based on the DMRS sequence identifier of a first DMRS candidate, an extractor adapted to extract a signal sequence from the received signal using the plurality of PRB indicators of the first DMRS candidate, and a quality measure computation block adapted to compute one first quality measure for the first DMRS candidate based on the extracted signal sequence and the calculated DMRS sequence. The receiver circuitry comprises an evaluation control configured to control a decoding of the plurality of control channel message candidates by selecting based on said first quality measure at least one control channel message candidate for decoding of a received control channel message.

Further one receiving circuitry and embodiments thereof are provided, which receiving circuitry is adapted to receive from a wireless network system demodulation reference signals, DMRS, and encoded control channel messages mapped to a plurality of physical resource blocks, PRBs. The receiving circuitry is configured to evaluate a plurality of control channel message candidates. Each control channel message candidate being associated with one DMRS candidate of a set of DMRS candidates. A DMRS candidate comprises a plurality of physical resource block indicators and one DMRS sequence identifier. The receiving circuitry is configured to receive a signal from the wireless network system. The receiving circuitry further comprises a calculator configured to calculate a DMRS sequence based on the DMRS sequence identifier of a first DMRS candidate, an extractor adapted to extract a signal sequence from the received signal using the plurality of PRB indicators of the first DMRS candidate, and a quality measure computation block adapted to compute one first quality measure for the first DMRS candidate based on the extracted signal sequence and the calculated DMRS sequence. The receiving circuitry comprises also an evaluation control configured to compare the first quality measure with a pre-set threshold value for determining if a threshold criterion is fulfilled, and to select the control channel message candidates associated with the DMRS candidate or candidates for the evaluation for which the threshold criterion is fulfilled.

One advantage with the above methods and receiving circuitries is that battery power and processor time is saved. An UE using the methods and receiving circuitries can enter a power saving mode more often.

BRIEF DESCRIPTION OF THE DRAWINGS

The foregoing, and other, objects, features and advantages of the present invention will be more readily understood upon reading the following detailed description in conjunction with the drawings in which.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention with unnecessary detail.

Figure 1:
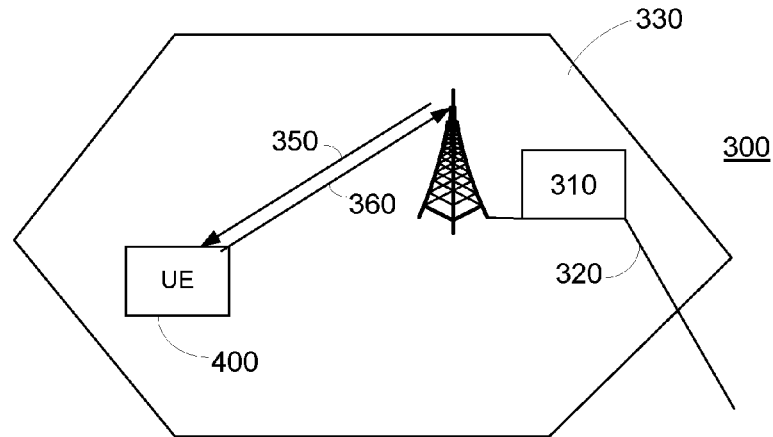
FIG. 1 is a block diagram of an exemplary network in which systems and methods described herein may be implemented.

FIG. 1 is a diagram showing a schematic wireless network system, preferably a LTE radio access network (RAN) serving a user equipment. The wireless network system 300 comprises an eNodeB 310 for enabling wireless downlink 350 and uplink 360 communications with a user equipment 400 within a cell 330. The eNodeB is in charge of a set of cells. Most of the Radio Network Control functionality is incorporated in the eNodeB, which is in charge of single cell radio resource management decisions, handover decisions, scheduling of user both uplink and downlink in its cells, etc. The eNodeB is connected to the core network using the S1 interface 320.

Figure 2:
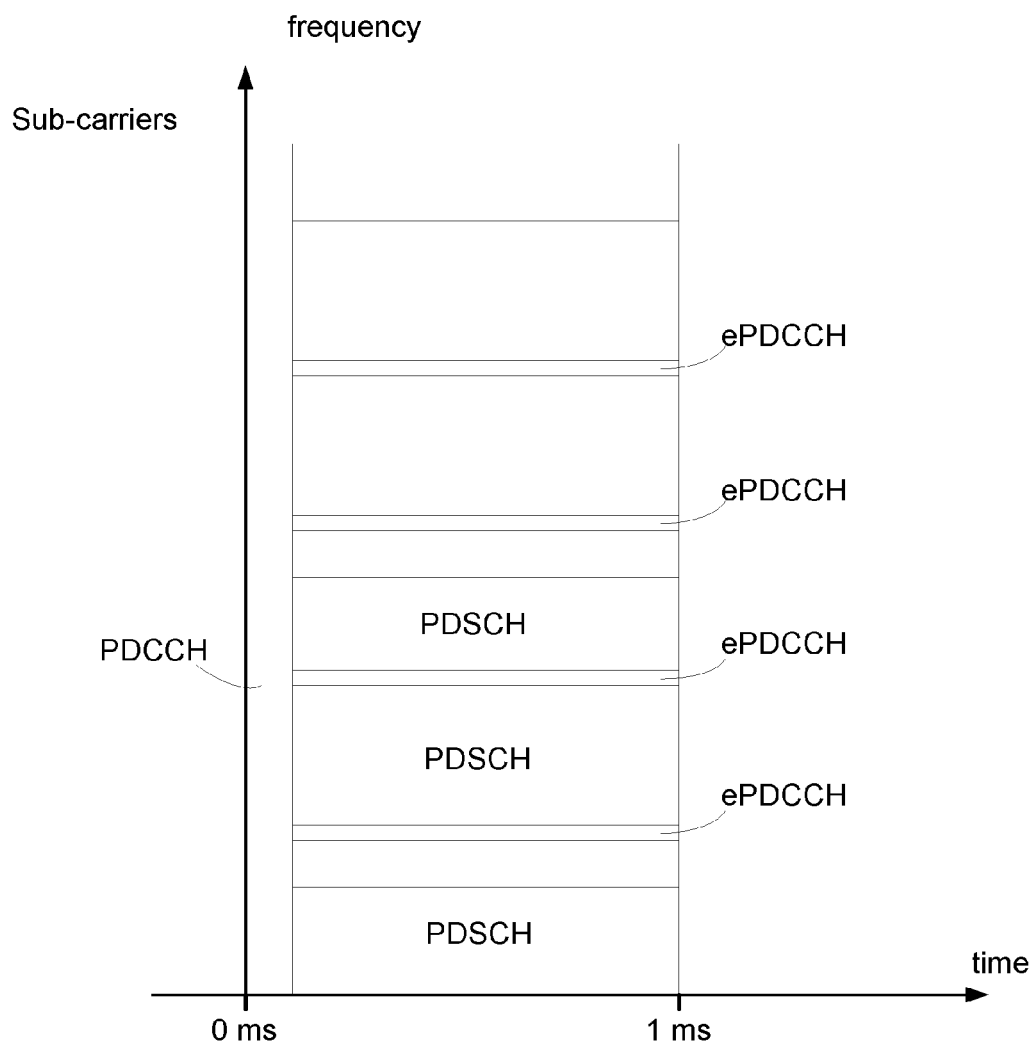
FIG. 2 is a block diagram showing an exemplary mapping of physical channels on physical resource blocks.

FIG. 2 is a diagram showing the mapping of physical channels on physical resource blocks, PRBs, over the time period of a sub-frame, i.e. two slots. The physical downlink control channel, PDCCH, is mapped onto the first 1-3 OFDM symbols of each sub-frame. The PDCCH is common for all user equipments in a cell. The remaining OFDM symbols of a sub-frame are, among others, used for the mapping of the physical downlink shared channel, PDSCH, comprising the data load of a service for the user equipments within the cell.

The enhanced physical downlink control channel (ePDCCH) is a downlink control channel that is introduced in release 11 of the 3GPP LTE standard. It is used to carry downlink and uplink scheduling information, and partly replaces the PDCCH control channel. In future releases of LTE, the ePDCCH might be extended to carry more control information such that it replaces PDCCH completely. As already discussed in the background section of this disclosure, ePDCCH is frequency-multiplexed with PDSCH, and the ePDCCH spans both slots in a sub-frame. This means that the whole sub-frame has to be received before the decoding the ePDCCH is possible to perform. The ePDCCH is transmitted in a similar way as PDSCH, i.e. the reception of a message is based on the reception of a demodulation reference signal, DMRS. Each UE is configured by the wireless network system with a DMRS. If a message is to be sent from the network system to the UE, the DMRS is scheduled and transmitted with the message. If there is no DMRS recognized by the UE in a PRB, there is most probably no message for the UE there. If there is a recognizable DMRS in a PRB, there may also be a message transmitted.

Figure 3:
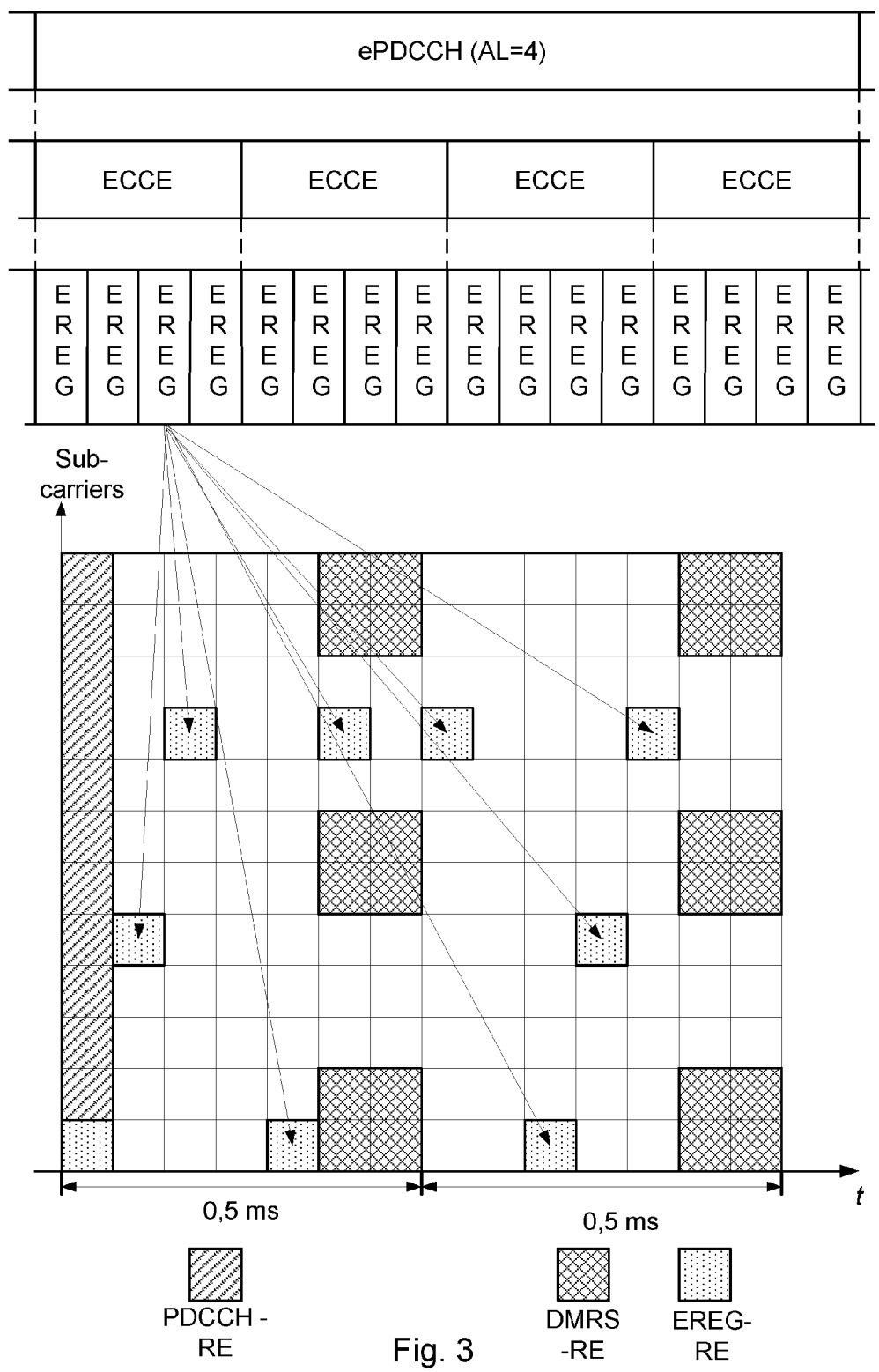
FIG. 3 is a block diagram illustrating the principles when an ePDCCH is mapped onto resource elements in a PRB.

FIG. 3 illustrates the principles when an ePDCCH is mapped onto resource elements in a PRB.

Regarding ePDCCH and enhanced Control Channel Elements (ECCEs), the PDCCH principles of Control Channel Element aggregation are reused. On top of FIG. 3 is an illustration of ePDCCH given. According to the following example, the ECCE aggregation level, AL, is set to 4, i.e. AL=4. This means that an ePDCCH is formed of 4 ECCEs. Further, each ECCE is formed by grouping Enhanced Resource Element Groups (EREGs). Nominal ECCE size is 36 Resource Elements (RE) as for the legacy CCE. However, the effective size is in general smaller due to puncturing in contrast to CCE. EREG indices are selected to minimize differences in the effective ECCE sizes. One ECCE is formed by 4 EREGs.

The mapping principle of an ePDCCH message, i.e. a coded DCI message, to REs is:
  mapped to available REs belonging to all EREGs associated with the ePDCCH message;
  over frequency direction: first across all PRB pairs used for the ePDCCH message;
  in time direction: within the subframe.

Due to the distribution of the control channel information on possibly all but the first OFDM symbols of the subframe, decoding of ePDCCH cannot commence until the entire subframe is received. This is in contrast from PDCCH which is present only in the first one, two, or three OFDM symbols of a subframe time interval.

If a downlink transport block is scheduled using ePDCCH, decoding of it cannot begin until ePDCCH is decoded. In order to meet the tight latency requirements of the standard it is hence critical that decoding of ePDCCH is done as fast as possible.

Decoding of ePDCCH requires testing of several candidates, each candidate being defined by a set of parameters. Testing of such a candidate is called a "blind decode". A UE is required to test up to 32 such blind decodes. Typically a UE will test several hypotheses prior to finding a valid ePDCCH. Even if a valid ePDCCH is detected in a blind decode, UE might be required to continue testing other blind decodes. This is because several ePDCCH might be sent to a given UE in a subframe.

Testing several hypothesis using blind decodes requires processing time, a critical resource given the latency budged mentioned above. Testing several hypotheses also makes the processing circuitry consume power.

Note that hypothesis testing may be performed in a parallel or it may be performed sequentially.

Each UE is configured to search for ePDCCHs in a set of PRB pairs of a received signal. Each PRB has an identifier, i.e. a number or an index. A number of parameter id used for configuring UEs and ePDCCHs:
  Parameter Description
  PAP List of Physical Antenna Ports
  $n_{CI}$ Carrier indicator field
  Parameters for each set i Description
  $S_i$ Indicator list for PRBs to be searched
  $n_{ID,i}$ ePDCCH identifier—specifies DM-RS sequence and scrambling sequence for each i.

Parameters for each message Description
  $n_{RNTI}$ RNTI (Radio-Network Temporary Identifier)—specifies search space and scrambling of CRC (Cyclic Redundancy Check)
  Search Space ID Selected control channel message candidate in search space
  ePDCCH set selected set of control channel messages to use
  ePDCCHfomat Determines aggregation level together with DCI format and presence of eSS (Enhanced Synchronization Signals) and CSI-RS (Channel State Information Reference Signal).)
  DCIformat Downlink Control Information format, e.g. "2D" or "4"

The UEs are configured to use the following parameters for evaluating ePDCCH message parameters: PAP, $n_{CI}$, $S_i$, $n_{ID,i}$, $n_{RNTI}$. An UE is able to decode a control channel message, if received, by means of said parameters and blind decodes specifying the parameters Search Space ID, ePDCCH set, ePDCCHfomat and DCIformat.

Thus, the ePDCCH format and DCI format is unknown to a UE, which therefore has perform blind decoding. There is a number of blind decodes to be tested. It is blind as the parameter values are unknown, and said parameter values ha to be blindly evaluated.

The UE can be configured with 1 or 2 sets comprising PRB pairs to be used in ePDCCH. The two sets can have different size, $N_i=\{2, 4, 8\}$, i.e. 2, 4 or 8 pairs of PRBs. Sets may also be overlapping. Each set has a DM-RS configuration. The blind decodes are distributed over the sets—in total 32 blind decoding.

The ePDCCH contains a DCI message that gives scheduling information for the downlink or/and the uplink (grant for the UE for uplink transmission).

The problem is to find the information about the ePDCCH format, i.e. the parameters defining the format. If a two set configuration is used, the information may be located to either one of the sets or both sets. Thus, one message may be located in one of the sets and the other message in the other set, but the two messages may also be located in one of the sets.

The standard defines which control channel message candidates to test and look for. The radio network has to insert a control channel message according to the set configuration of the UE. The set configurations are provided by the network. The UE is configured to decode the candidates in its configured search space. The search space is configured by the parameter $n_{RNTI}$, which is included in the list of parameters that configures a UE. The configuration defines exactly where in a set of PRBs the UE should look for a message. However, the UE has to test all candidates and check if the decoding makes sense. The test of all candidates cost a lot of processing time. Further, when a UE is scheduled on ePDCCH, there is less time available for PDSCH processing compared to when scheduled on PDCCH.

In order to estimate the radio channel in the receiver, known DMRS are inserted into the transmitted signal. One such reference signal consists of a sequence of complex valued numbers, which can be extracted from a predefined table or calculated with a predefined mathematical formula as specified in standard documents [See e.g. 3GPP TS 36.211]. In both these cases, one or a few index values are used to identify each sequence. For OFDM based systems, such as LTE, the position in both time and frequency for a reference signal must also be known. Within wireless standard documents, a number of predefined configurations for the time and frequency positions are specified. For LTE the time positions within each 1 ms interval, are fixed while the frequency positions are defined by specifying PRB (Physical Resource Block) pairs. One such PRB pair consists of 12 subcarriers and 14 OFDM symbols. Once the PRB pair is defined, the position of the DMRS within the PRB pair is fixed.

A combination of one reference signal index and at least one PRB pair defines a DMRS candidate. These DMRS candidates might be defined such that they define overlapping PRB pairs. For ePDCCH, the receiver can be configured to estimate the channel for a number of such DMRS candidates.

A downlink control channel message is transmitted from eNodeB to the UE and consists of a bit sequence convey scheduling information to the UE. In the transmitter, a CRC (Cyclic Redundancy Check) is calculated from this control bit sequence. This CRC is attached to the control bit sequence and it is used by the receiver to detect if the bit sequence was correctly received. The control bit sequence, together with the CRC bits, are then channel coded, in which redundancy is introduced forming a new bit sequence. This channel coded bit sequence can be decoded in the received signal such that the receiver can correct bit errors occurring within the wireless communication. The channel coded bit sequence is then scrambled and modulated, i.e. mapped to complex numbers following a predefined modulation format, in this case QPSK. For an OFDM based system such as LTE, these complex valued symbols are mapped to time and frequency positions known as RE (Resource Elements). The number of RE needed depends on number of message bits to be transmitted, modulation format, and the amount of redundancy added within the channel coding. In order to achieve a flexible air interface, a number of possible mappings are defined and the UE is configured to extract the RE for a number of such candidates. After extracting the RE, the UE uses a channel decoder and calculates a CRC. If the CRC indicates that a message was correctly decoded, then the UE knows that the eNodeB transmitted a control message on that specific configuration. Each configuration defines one control channel message candidate.

Figure 4:
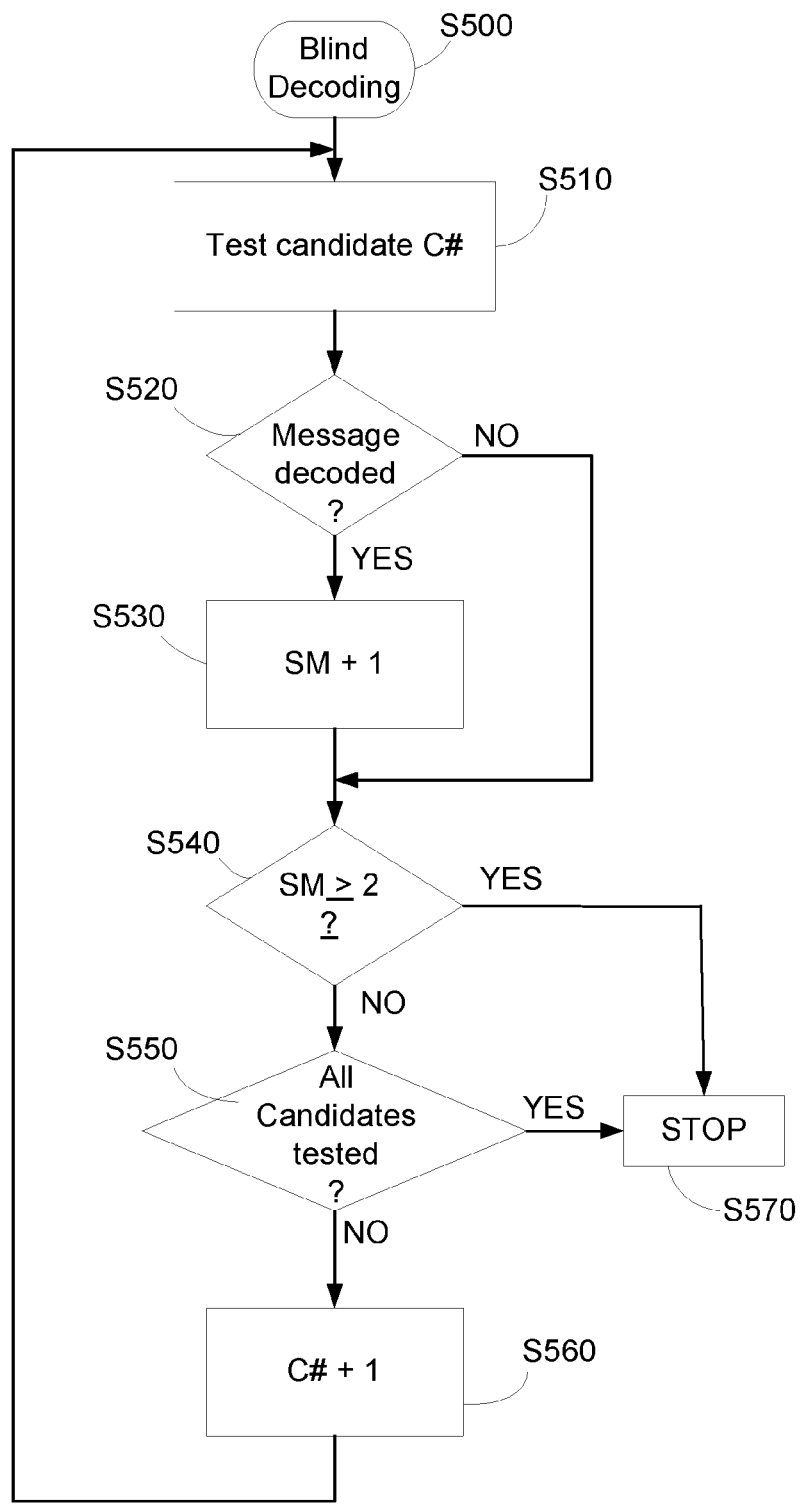
FIG. 4 is a flowchart illustrating the blind decoding of the control channel messages.

FIG. 4 is a flowchart illustrating the blind decoding of the control channel messages.

The blind decoding S500 starts with setting a control channel candidate counter C# to "1" (one) and a decoded message counter, SM, is set to "0" (zero). In step S510, the first candidate of the list of control channel candidates is tested. In step S520, if a candidate has the correct format (test criterion fulfilled, "yes"), the candidate is properly decoded, which results in a DCI message having a message that is consistent. The decoded message counter, SM, is increased with "1", in step S530.

In the described embodiment of the blind decoding, the number of expected messages is 2. In other embodiments of the blind decoding, the number of expected messages may be less or more than 2.

If the CRC indicates that a message was not correctly decoded, the decoded message counter, SM, is not increased. The process then proceeds with step S540.

In the next step, S540, it is tested if the number of decoded messages, SM, has reached the number of expected messages. If the counter SM indicates that the number of messages has reached the number of expected messages, the blind decoding process is stopped in step S570. If not, the process is continued with a test, S550, wherein it is tested whether all candidates have been tested, or not. If the control channel candidate counter C# has reached the number of the final candidate, the test criterion is fulfilled, "yes", the blind decode is stopped in S570. If the criterion is not fulfilled, "no", the process is continued by step S560.

As not all candidates of the list have been tested, the process proceeds by increasing the control channel candidate counter C# with "1" (one), in step S560, and getting the next candidate not yet tested in step S510.

Thus, as understood, the blind decode process is a loop that may test all listed candidates until the number of expected messages is reached or all candidates are tested.

Actually, according to prior art the blind decode process S500 is performed every time even though there is no control channel message in the configured PRBs dedicated to the UE.

The following described evaluation process provides the possibility to reduce the amount of control channel message candidates that is tested, either by eliminating control channel message candidates or by controlling the order the candidates are tested, e.g. that the candidates that are more likely to comprise a message is tested before the candidates that is less likely to contain a message.

The evaluation process is a method for evaluating and decoding candidates which could be stopped in an early stage of the process of evaluating and decoding all configured candidates.

One criterion for interrupting or stopping the evaluation process in an early stage of the process that comprises the decoding process may be that if there is no demodulation reference signal, DMRS, there is no message for the UE in the search area. However, the opposite is not true. Even if there is DMRS, this is not a guarantee that the search area comprises a message for the UE.

The radio network inserts DMRS in determined resource elements, REs, in all PRBs. The UE is configured to look in certain PRB pairs and it is also configured to expect a certain DMRS sequence. If the expected sequence is not present in the expected REs in a PRB, the UE should not evaluate the control channel message candidates associated with the DMRS sequence.

Channel estimates $H_l^r(k,i)$ are typically produced using interpolation between two or more raw channel estimates. The raw channel estimates are computed by de-rotating the received reference signal data with the assumed transmitted pilot data, which is an accepted computation technique. Due to the structure of the LTE DMRS some additional processing is also required, but this is not of importance here. Interpolation is made using some assumptions on how the underlying radio channel may vary as a function of frequency and time, and assumptions on signal-to-noise-ratio.

If the channel estimation is based on the wrong assumptions on the presence of and sequence used for the DMRS, then the residuals $R^r(m,i)$ will have much higher power than would be the case if the DMRS corresponding the a correct assumption are present. In order to detect DMRS (and thereby also detect presence of ePDCCH), the power of the residuals can be compared to the power of the interpolated channel estimates $H_l^r(k,i)$. Now, if the SNR is low or if received power is high, then the residuals would also be large. However, it is possible to distinguish these effects from those stemming from the effect above as will be described next.

As one exemplifying embodiment to detect DMRS (and thereby also detect possible presence of ePDCCH), the power of the residuals $$\hat{\sigma}^2 = \sum_r \sum_m |R^r(m,i)|^2$$

can be compared to the power of the interpolated channel estimates $H_l^r(k,i)$ $$\hat{\rho} = \Sigma_r \Sigma_k \Sigma_l |H_l^r(k,i)|^2.$$

If the power of the interpolated channel estimates is higher than the residuals scaled by an appropriate scaling factor, then the DMRS are considered as detected, i.e.

$$C_i = \frac{\hat{\rho}}{\hat{\sigma}^2} > T$$

This threshold T, is a design variable which should be selected with care. If a high threshold is selected, then the rate of missed DMRS detections will be high. On the other side, if the threshold is selected low, the rate of false detected DMRS sequences will be high. Theoretical calculations of false detection and missed detection rates, under assumptions of a simple radio channels and additive white Gaussian noise can be used as guidelines of how to select the threshold T.

As another exemplifying embodiment, $C_i$ could be chosen as $$C_i = \frac{\sum_{k,r,l} |H_l^r(k,i)|^2}{\left(\sum_{k,r} |R^r(m,i)|^2 + \varepsilon\right)}$$

The detection statistic may also be computed in many other ways. For simplicity (and without limiting the scope) we make the assumption that a larger $C_i$ indicates higher confidence in the channel estimates.

In one embodiment of the invention a suitable level of the threshold T needs to be selected. A good criterion for such selection is to have it selected lower than a value that corresponds to an SNR were decoding is likely to fail even if it was to be initiated, and if the highest possible aggregation level was set.

The present evaluation method provides a method for determining if the received sequence is an expected sequence, or not.

Figure 5:
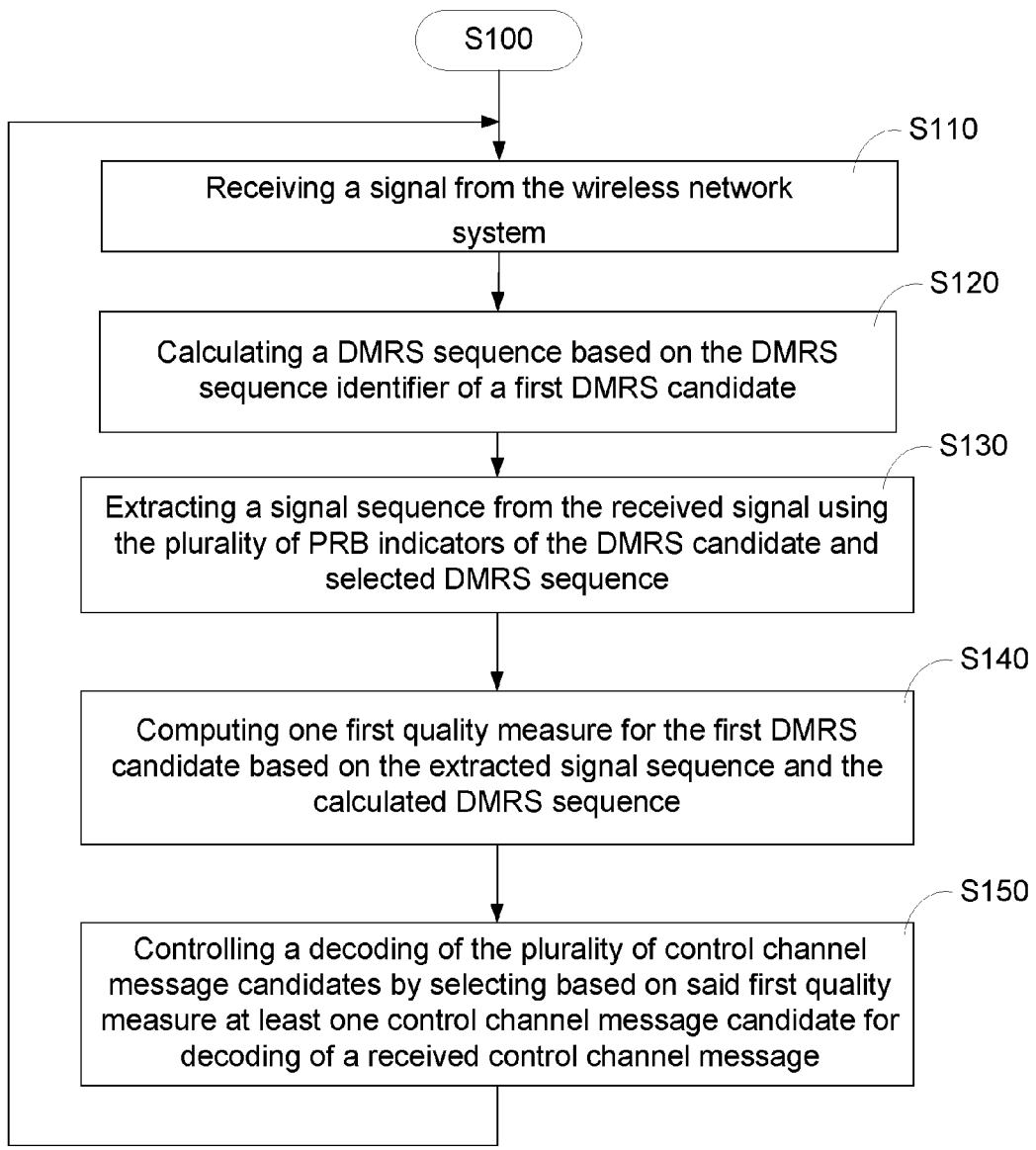
FIG. 5 is a flowchart illustrating a first embodiment of an evaluation method.

FIG. 5 is a flowchart illustrating an embodiment of the present evaluation method. Said method is performed in a receiver of a user equipment, which is adapted to receive from a wireless network system demodulation reference signals (DMRS) and encoded control channel messages mapped to a plurality of physical resource blocks (PRBs). The user equipment is configured to evaluate a plurality of control channel message candidates. Each control channel message candidate being associated with one DMRS candidate of a set of DMRS candidates. A DMRS candidate comprises a plurality of PRB indicators and one DMRS sequence identifier. The method comprises:

S110: Receiving a signal from the wireless network system. The UE receives a signal and the UE receiver processes the signal by means of a Fast Fourier Transformation (FFT).

S120: Calculating a DMRS sequence based on a DMRS sequence identifier of a first DMRS candidate. An UE is configured by sets of parameters, as described above herein. One of the sets is denoted a first set, i=0, and it comprises a first DMRS candidate, which is associated with the ePDCCH identifier $n_{ID,i}$. Said identifier specifies the DMRS sequence and scrambling sequence for i=0. This calculation is described in chapter 6.10.3A.1 of the document 3GPP TS 36.211 V11.1.0.

S130: Extracting a signal sequence from the received signal using the plurality of PRB indicators of the first DMRS candidate. Raw channel-estimates are computed by de-rotating the received reference signal data with the assumed transmitted pilot data. Due to the structure of the LTE DMRS some additional processing is also required, but here it is of less importance. A first step in the evaluating of ePDCCH candidates is estimating the radio channel between the transmitter and receiver. This estimation is made using demodulation reference signals, DMRS. The radio channel estimates are then used in subsequent steps to evaluate the control channel message candidates that are associated with the given set of parameters. The radio channel estimates are then used to equalize the modulation symbols. The resulting equalized modulation symbols are then used in subsequent decoding steps. In order to estimate the radio channel based on DMRS, the transmitted sequence must be known to the receiver. In the case of ePDCCH, the UE is configured with which DMRS sequence to assume as part of the ePDCCH set configuration described above.

S140: Computing one first quality measure for the first demodulation reference signal candidate based on the extracted signal sequence and the calculated demodulation reference signal sequence. The invention involves computing a Quality measure $C_i$ that is a function of interpolated channel estimates $H_l^r(k,i)$ and residuals $R^r(m,i)$. As one exemplifying embodiment to detect DMRS (and thereby also detect presence of ePDCCH), the power of the residuals $$\hat{\sigma}^2 = \sum_r \sum_m |R^r(m,i)|^2$$

can be compared to the power of the interpolated channel estimates $H_l^r(k,i)$ $$\hat{\rho} = \Sigma_r \Sigma_k \Sigma_l |H_l^r(k,i)|^2.$$

The calculation of interpolated channel estimates, residuals and the quality measure $C_i$, and embodiments of S140 will be described and discussed further down in this disclosure.

S150: Controlling a decoding of the plurality of control channel message candidates by selecting based on said first quality measure at least one control channel message candidate for decoding of a received control channel message. The employed decoding process is described in the blind decoding process illustrated and described above, see FIG. 4.

The concept of the present evaluation method is to, based on a quality measure $C_i$, determine which control channel message candidates that need to be evaluated, and possible also determine in which order the control channel message candidates should be evaluated. When a quality measure $C_i$ for the first DMRS candidate has been calculated the quality measure is compared to a threshold, say, T. If $C_i$ is smaller than the threshold, detection of all control channel message candidates corresponding to the first demodulation reference signal candidate, i.e. parameter set i, is discontinued. If it is larger than the threshold, detection continues.

Regarding steps S120 to S140, a channel estimation process is described in which a number of interpolated channel estimates are produced. The interpolated channel estimates are denoted with $H_l^r(k,i)$, where superscript r= 0 . . . (R−1) denotes receive antenna, subscript l denotes transmit layer (in EPDCCH case corresponding to antenna ports 107 and 109). Index k=0, . . . , (K−1) denotes index of channel estimate in the set of PRBs in question. Typically index k corresponds to a specific position on the resource element grid. The value of K is implementation dependent. The index i=0, 1 indices the set of estimates belonging to different parameter set configurations. Typically a number of residuals are also computed. Denote them by $R^r(m,i)$, where superscript r denotes receive antenna index, and index m= 0, . . . , (M−1) denotes index of residuals in the set of PRBs in question. Typically different index m correspond to different reference signals resource elements, or groups of reference signal resource elements.

Figure 6:
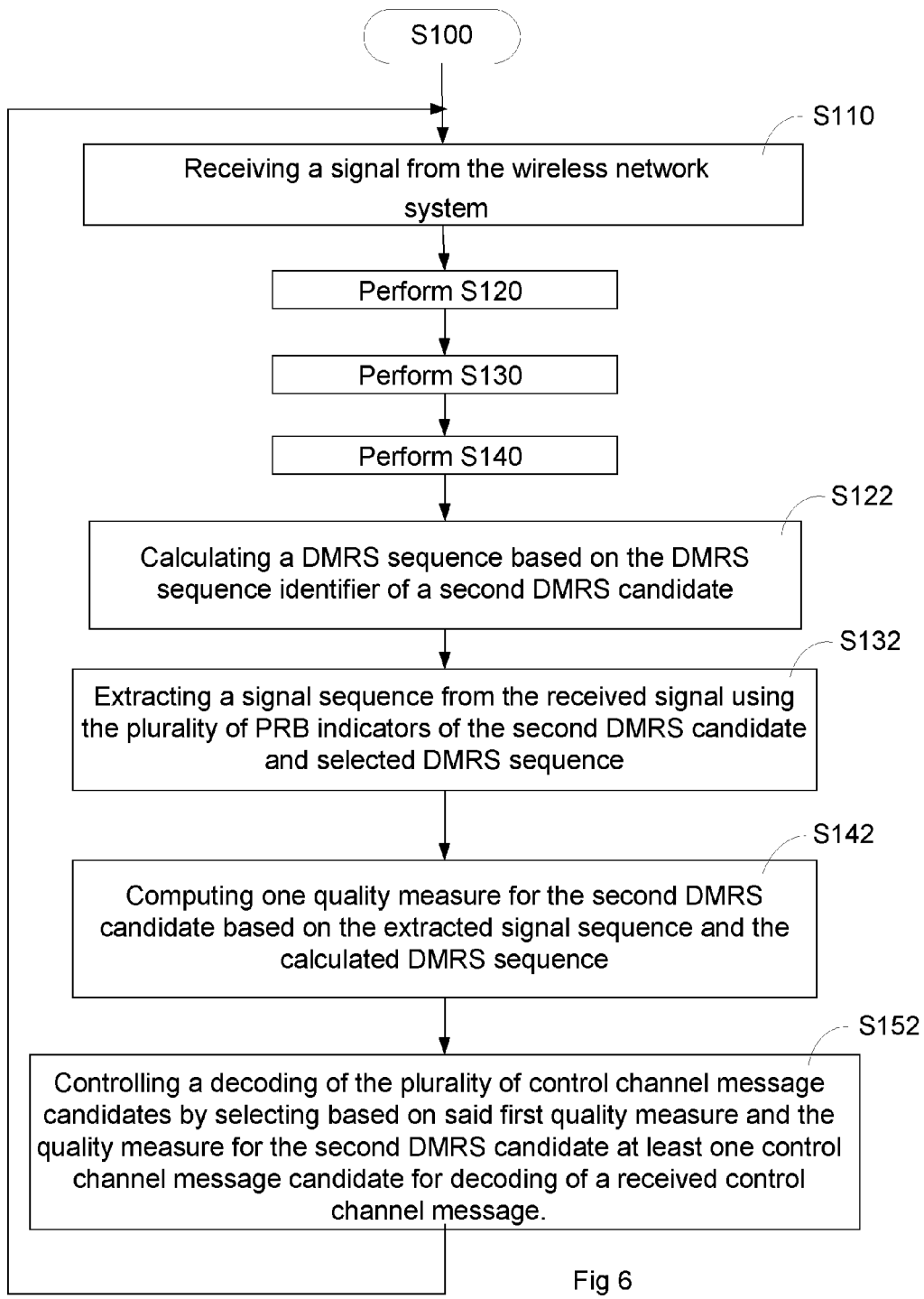
FIG. 6 is a flowchart illustrating further one embodiment of the evaluation method.

FIG. 6 is a flowchart illustrating further one embodiment of the evaluation method. According this embodiment, if an UE is configured with more than one set of parameters, at least a second quality measure may be computed as follows:

S122: Calculating a DMRS sequence based on the DMRS sequence identifier of a second DMRS candidate. A second set i=1 comprises a second demodulation reference signal candidate, which is associated with the ePDCCH identifier $n_{ID,i}$, which specifies the DMRS sequence and scrambling sequence for i=1. This calculation is described in chapter 6.10.3A.1 of the document 3GPP TS 36.211 V11.1.0.

S132: Extracting a signal sequence from the received signal using the plurality of PRB indicators of the second DMRS candidate. Raw channel-estimates are computed by de-rotating the received reference signal data with the assumed transmitted pilot data.

S142: Computing one quality measure for the second DMRS candidate based on the extracted signal sequence and the calculated DMRS sequence. The calculation of interpolated channel estimates, residuals and the quality measure $C_i$, is similar as in S140, which will be described and discussed further down in this disclosure.

S152: Controlling a decoding of the plurality of control channel message candidates by selecting based on said first quality measure and the quality measure for the second DMRS candidate at least one control channel message candidate for decoding of a received control channel message. In this embodiment of the method, the two quality measures are compared to each other, and order of detection of the two sets of hypotheses depends on the outcome of this comparison. The employed decoding is described in the blind decoding process illustrated and described above, see FIG. 4.

Figure 7:
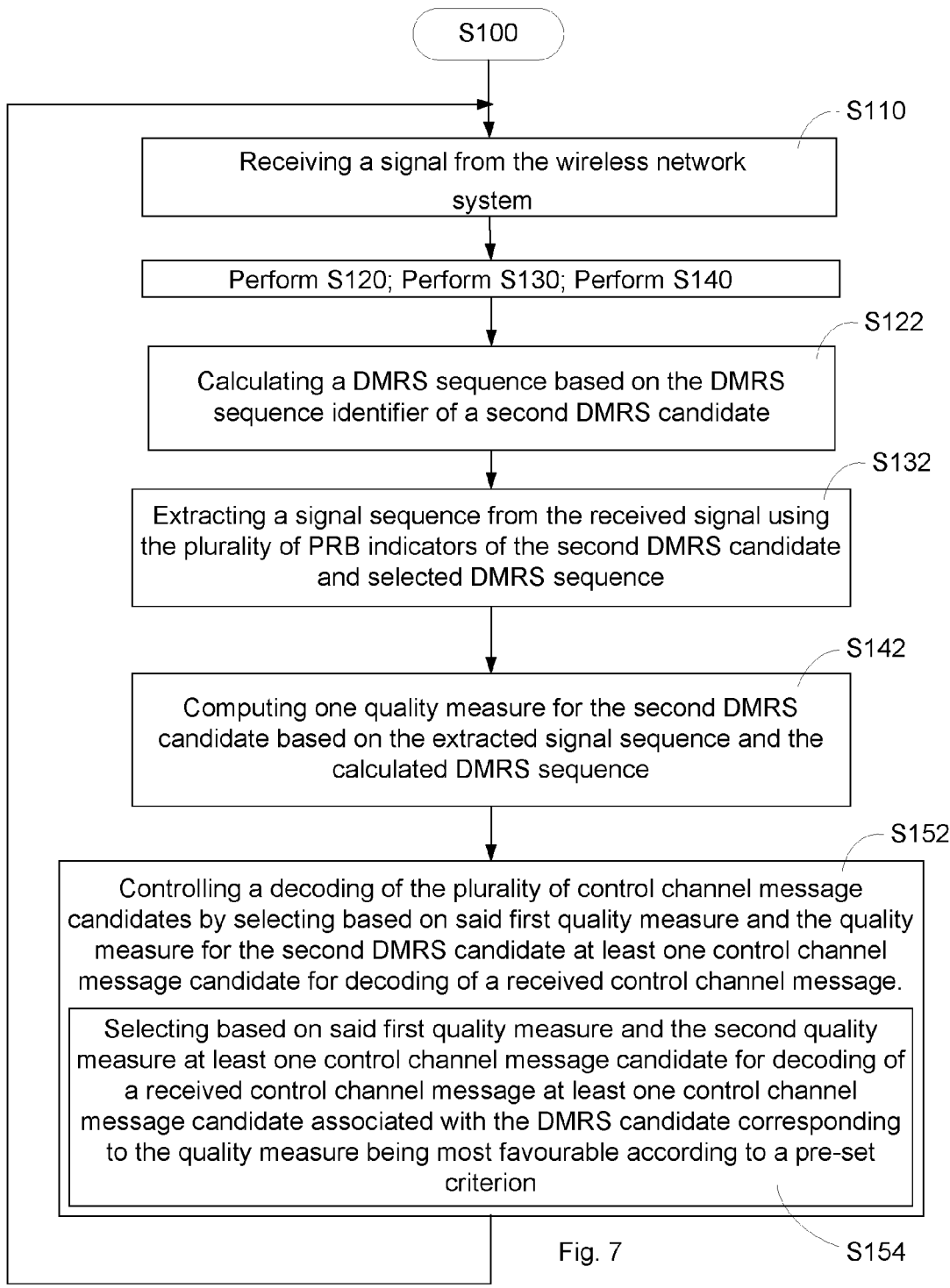
FIG. 7 is a flowchart illustrating further one embodiment of the evaluation method.

FIG. 7 is a flowchart illustrating further one embodiment of the evaluation method, wherein the controlling of the decoding of the plurality of control channel message candidates comprises:

S154: Selecting based on said first quality measure and the second quality measure at least one control channel message candidate for decoding of a received control channel message at least one control channel message candidate associated with the DMRS candidate corresponding to the quality measure being most favourable according to a pre-set criterion. The employed decoding is described in the blind decoding process illustrated and described above, see FIG. 4.

Figure 8:
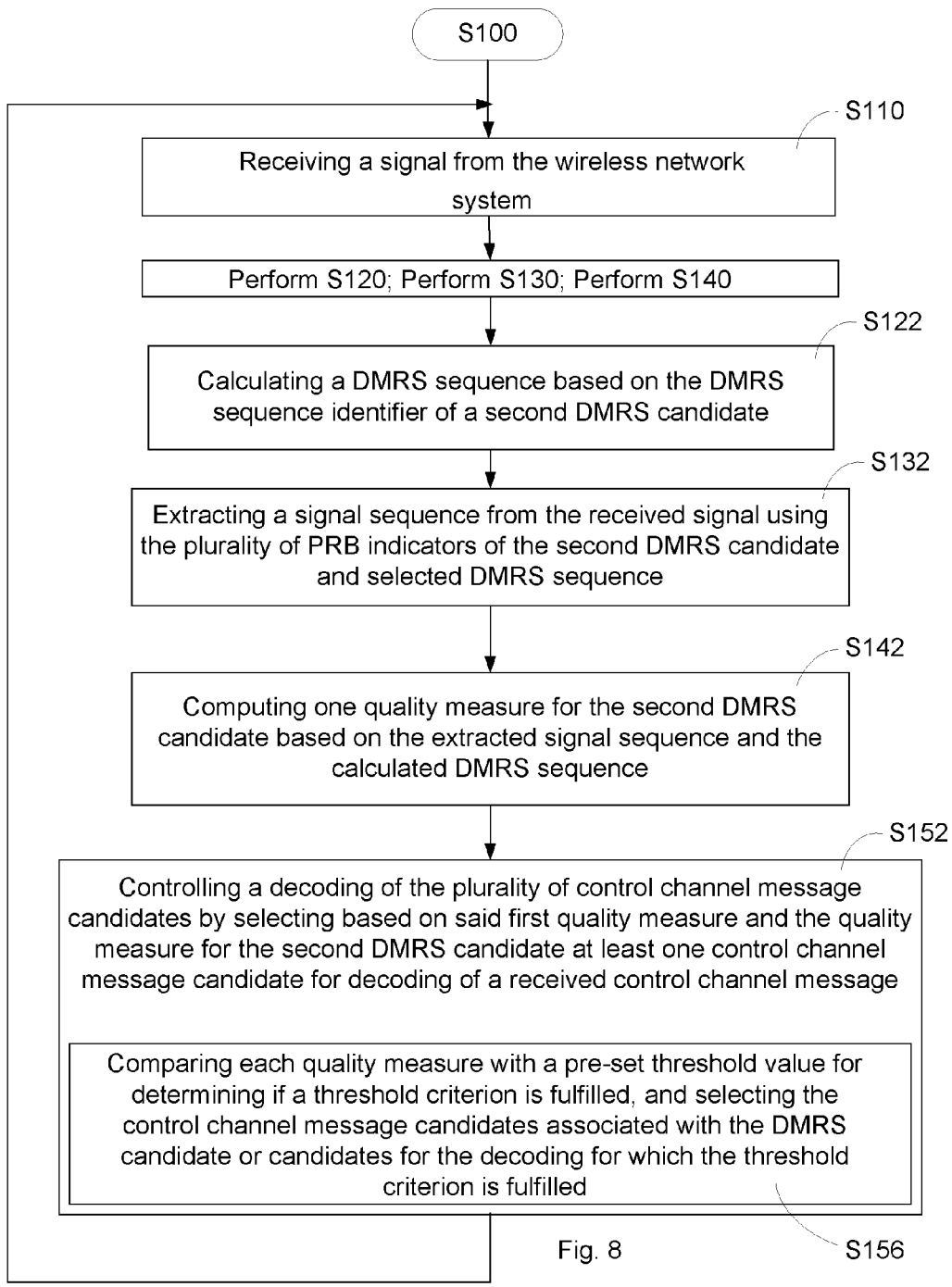
FIG. 8 is a flowchart illustrating further one embodiment of the evaluation method.

Yet further one embodiment of the evaluation method is illustrated in FIG. 8. According to the illustrated embodiment, the controlling of the decoding of the plurality of control channel message candidates, S152, comprises:

S156: Comparing each quality measure with a pre-set threshold value for determining if a threshold criterion is fulfilled, and selecting the control channel message candidates associated with the DMRS candidate or candidates for the decoding for which the threshold criterion is fulfilled. The employed decoding is described in the blind decoding process illustrated and described above, see FIG. 4.

Figure 9:
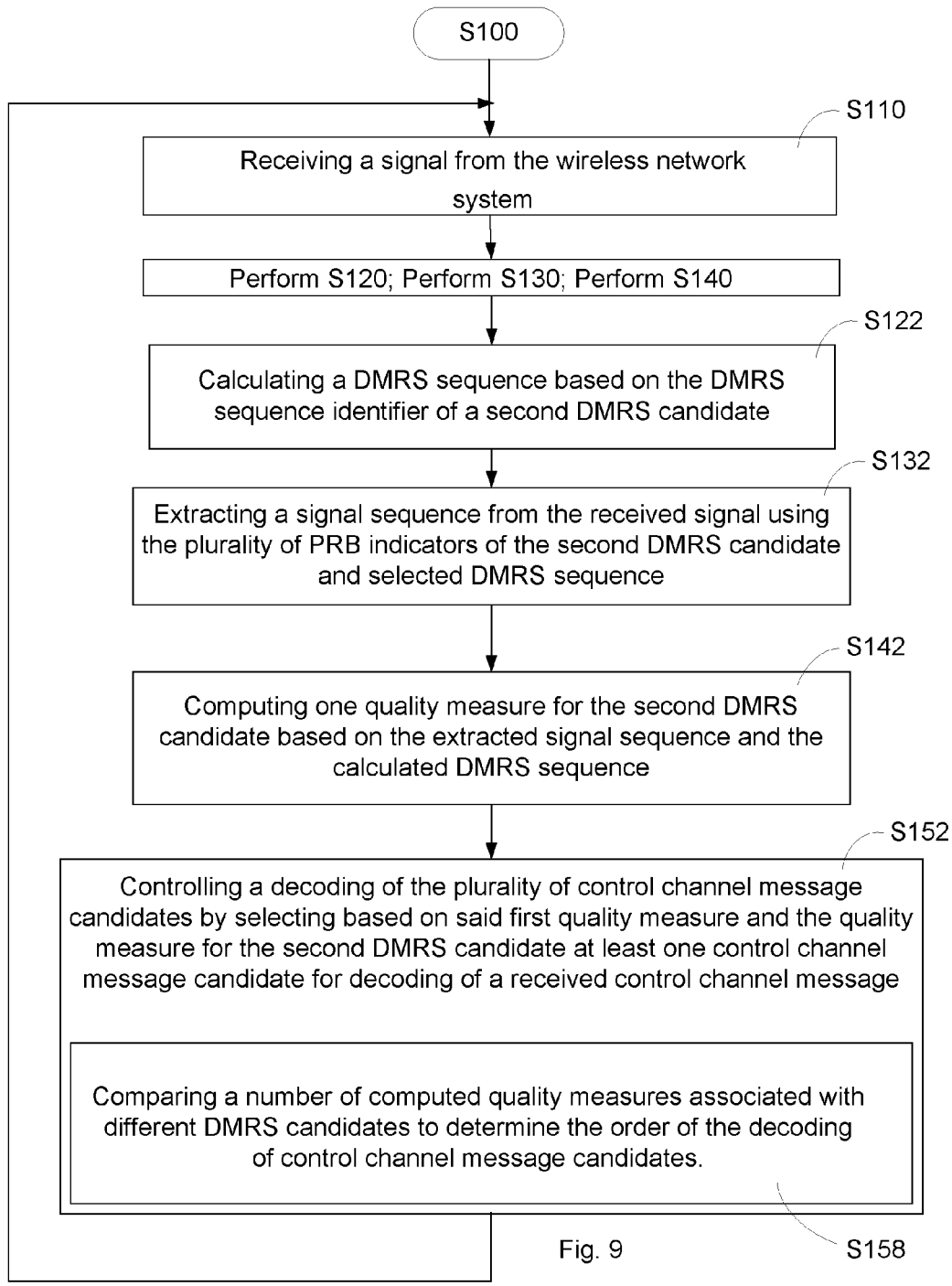
FIG. 9 is a flowchart illustrating further one embodiment of the evaluation method.

FIG. 9 is a flowchart illustrating further one embodiment of the method, wherein the controlling of the decoding of the plurality of control channel message candidates comprises:

S158: Comparing a number of computed quality measures associated with different DMRS candidates to determine the order of the decoding of control channel message candidates. The employed decoding is described in the blind decoding process illustrated and described above, see FIG. 4. According to some examples, the order of decoding of control channel message candidates may be determined by the value of the computed quality measures. The candidates may be decoded in an order starting with the candidate or candidates having the highest quality measure value to the candidate or candidates having the lowest quality measure.

Figure 10:
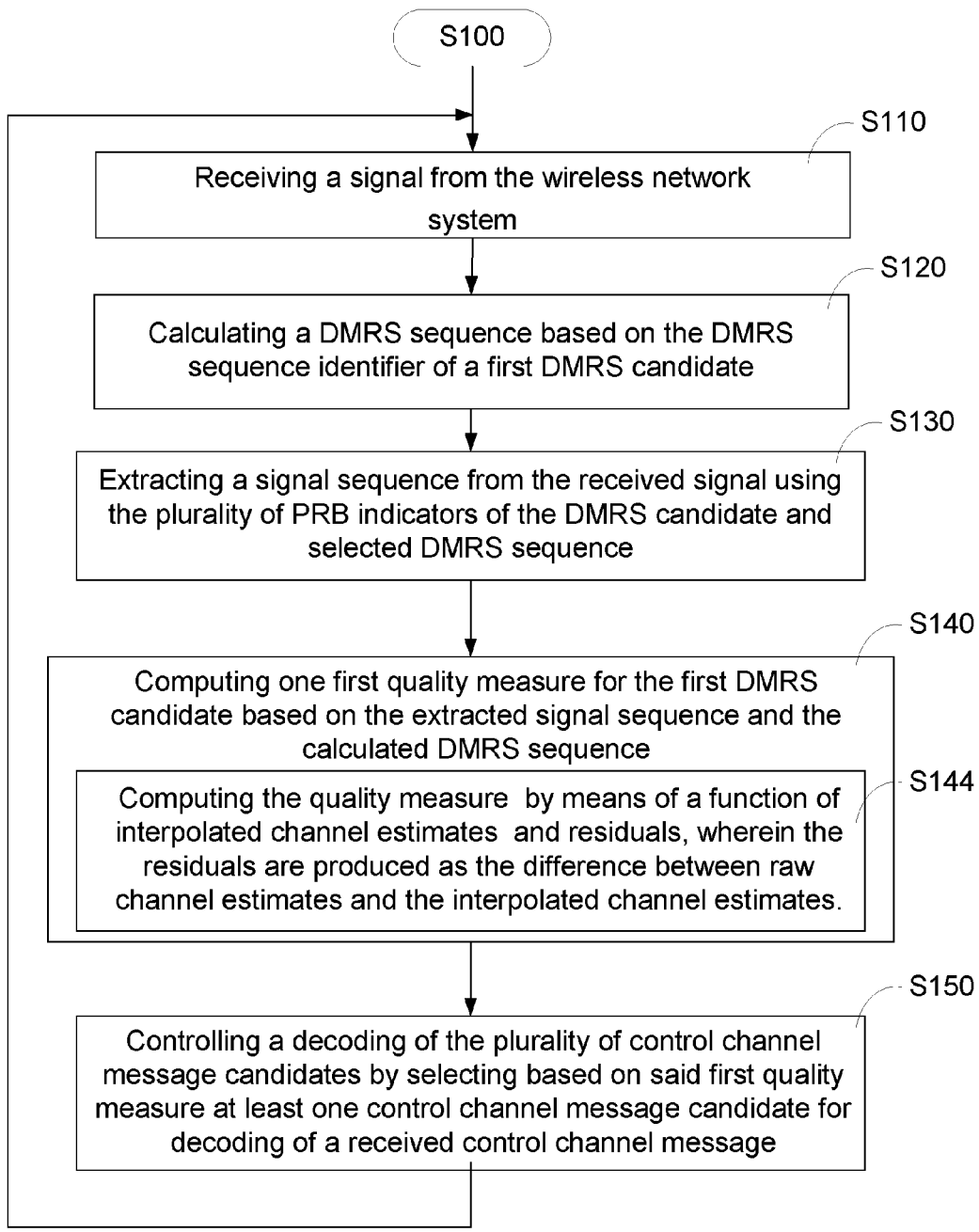
FIG. 10 is a flowchart illustrating further one embodiment of the evaluation method.

FIG. 10 is a flowchart illustrating some embodiments of the above descried methods, wherein steps S140 and S142 may involve:

S144: Computing the quality measure $C_i$ by means of a function of interpolated channel estimates $H_l^r(k,i)$ and residuals $R^r(m,i)$, wherein the residuals are produced as the difference between raw channel estimates and the interpolated channel estimates $H_l^r(k,i)$. The interpolated channel estimates are denoted with $H_l^r(k,i)$, where superscript r=0 . . . (R−1) denotes receive antenna, subscript/ denotes transmit layer (in EPDCCH case corresponding to antenna ports 107 and 109). Index k=0, . . . , (K−1) denotes index of channel estimate in the set of PRBs in question. Typically index k corresponds to a specific position on the resource element grid. The value of K is implementation dependent. The index i=0, 1 indices the set of estimates belonging to different parameter set configurations. Typically a number of residuals are also computed. The residuals are denoted by $R^r(m,i)$, where superscript r denotes receive antenna index, and index m=0, . . . , (M−1) denotes index of residuals in the set of PRBs in question. Typically different index m correspond to different reference signals resource elements, or groups of reference signal resource elements.

Figure 11:
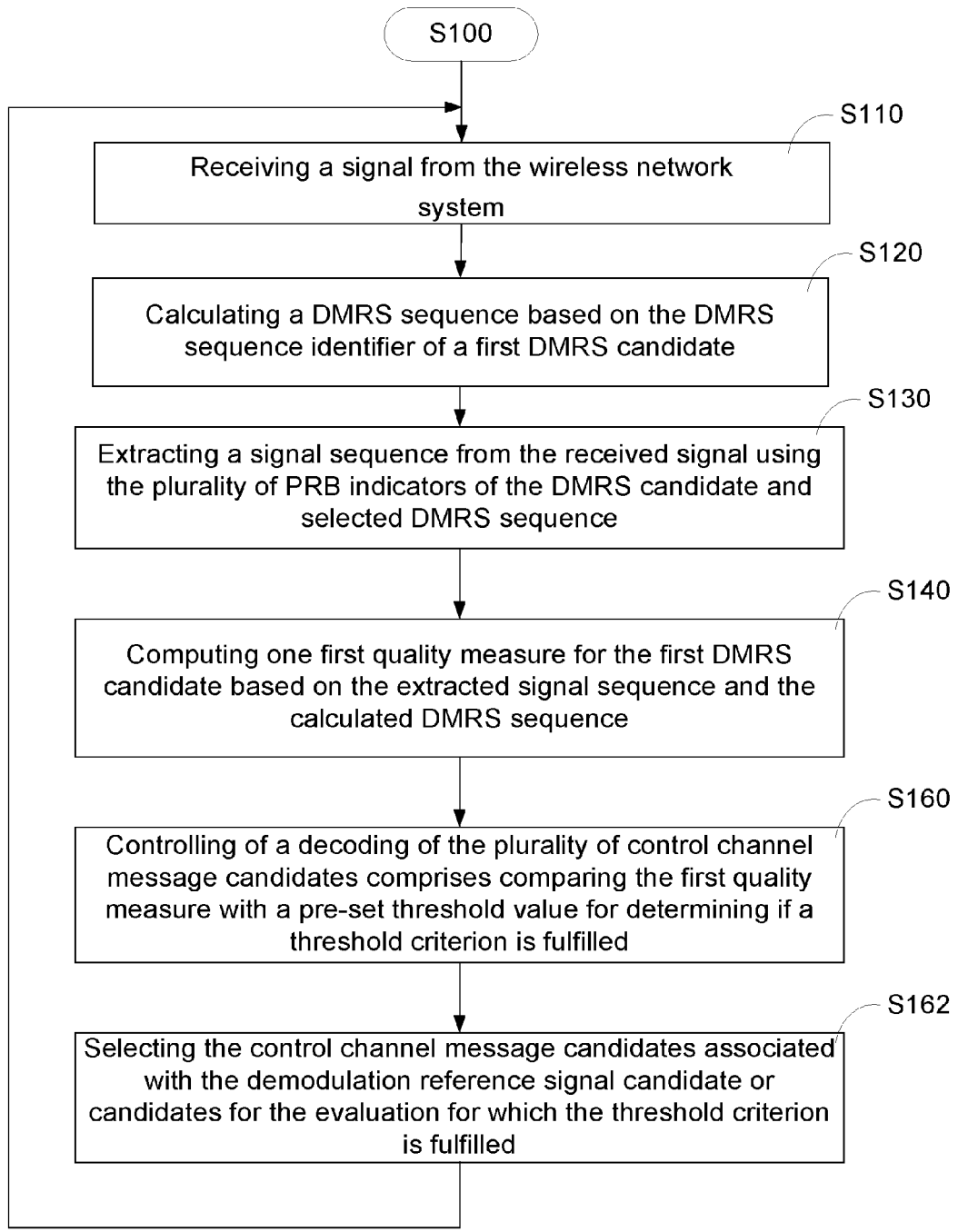
FIG. 11 is a flowchart illustrating further one embodiment of the evaluation method.

FIG. 11 is a flowchart illustrating further one embodiment of the method according to the present solution.

The method comprises:

S110: Receiving a signal from the wireless network system. The UE receives a signal and the UE receiver processes the signal by means of a Fast Fourier Transformation (FFT).

S120: Calculating a DMRS sequence based on a DMRS sequence identifier of a first DMRS candidate. An UE is configured by sets of parameters, as described above herein. One of the sets is denoted a first set, i=0, and it comprises a first DMRS candidate, which is associated with the ePDCCH identifier $n_{ID,i}$. Said identifier specifies the DMRS sequence and scrambling sequence for i=0. This calculation is described in chapter 6.10.3A.1 of the document 3GPP TS 36.211 V11.1.0.

S130: Extracting a signal sequence from the received signal using the plurality of PRB indicators of the first DMRS candidate. Raw channel-estimates are computed by derotating the received reference signal data with the assumed transmitted pilot data. Due to the structure of the LTE DMRS some additional processing is also required, but here it is of less importance. A first step in the evaluating of ePDCCH candidates is estimating the radio channel between the transmitter and receiver. This estimation is made using demodulation reference signals, DMRS. The radio channel estimates are then used in subsequent steps to evaluate the control channel message candidates that are associated with the given set of parameters. The channel estimates are then used to equalize the modulation symbols. The resulting equalized modulation symbols are then used in subsequent decoding steps. In order to estimate the radio channel based on DMRS, the transmitted sequence must be known to the receiver. In the case of ePDCCH, the UE is configured with which DMRS sequence to assume as part of the ePDCCH set configuration described above.

S140: Computing one first quality measure for the first demodulation reference signal candidate based on the extracted signal sequence and the calculated demodulation reference signal sequence. The invention involves computing a Quality measure $C_i$ that is a function of interpolated channel estimates $H_i'(k,i)$ and residuals $R^r(m,i)$.

Thus, S110-S140 are similar to the first method described above, see FIG. 5. The method according to FIG. 7 differs from said first method in that S150 of the first method is replaced by S160 and S162:

S160: Controlling of a decoding of the plurality of control channel message candidates comprises comparing the first quality measure with a pre-set threshold value for determining if a threshold criterion is fulfilled; and S162: Selecting the control channel message candidates associated with the demodulation reference signal candidate or candidates for the evaluation for which the threshold criterion is fulfilled. The employed decoding process is described in the blind decoding process illustrated and described above, see FIG. 4.

According to yet another aspect of the present invention, a receiving circuitry is provided. Said receiving circuitry is configured to support and perform the above presented and described method.

Figure 12:
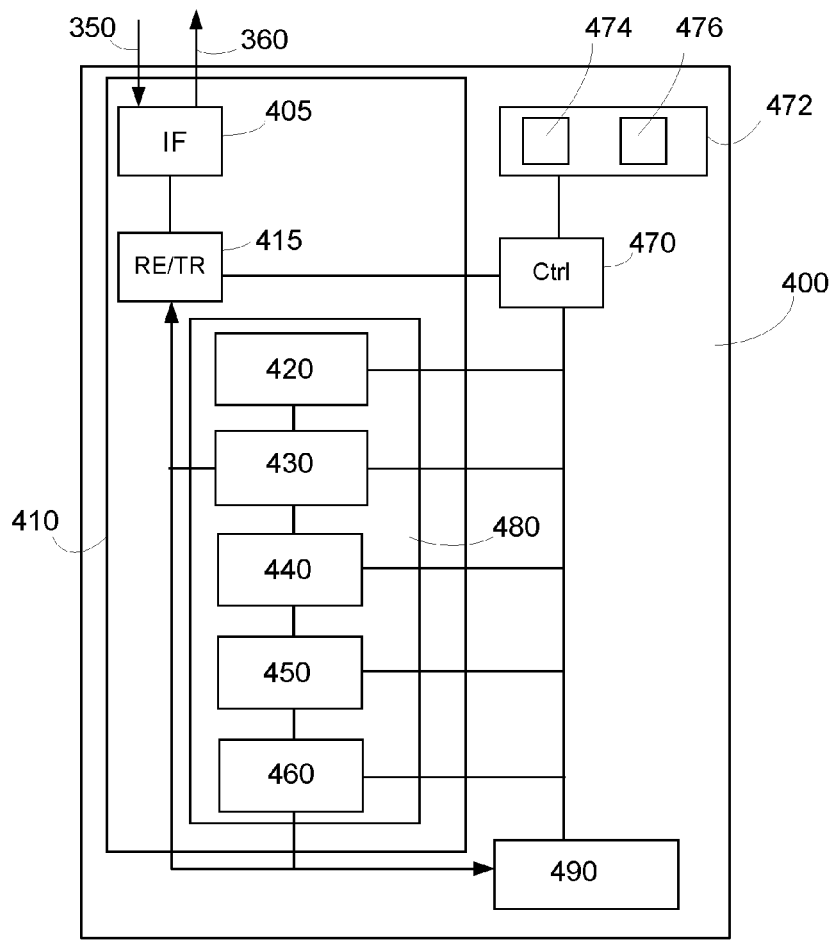
FIG. 12 is a block diagram illustrating one user equipment comprising a receiving circuitry adapted to perform any embodiment of the evaluation method.

FIG. 12 is a block diagram illustrating an embodiment of a receiving circuitry.

The receiving circuitry 410 is adapted to receive from a wireless network system 300 downlink signals. The receiving circuitry may be a radio receiver, or a radio transceiver comprising both receiver and transmitter circuitry. Both the receiving circuitry and the wireless network system are designed to support radio access at least according to the LTE (Long Term Evolution) standard. The radio signals are thus preferably sent over the radio interface according to OFDM (Orthogonal Frequency-division Multiplexing).

The receiving circuitry 410 comprises interface circuitry 405, e.g. an antenna or a plurality of antennas, e.g. a diversity antenna, having different antenna ports. The interface circuitry 405 is adapted to receive downlink data traffic and signals 350 structured into different physical channels in the time-frequency domain. The interface circuitry 405 may also be adapted to transmit uplink data traffic and signals 360 to a wireless network system.

Naturally, the receiving circuitry 410 comprises different well-known radio transmission functionalities, e.g. filters, amplifiers, demodulators, modulators, oscillators, etc., for enabling the reception and/or transmission of radio signal traffic. These well-known radio transmission functionalities are indicated as a block 415, but as a skilled person realizes, the functionalities may be distributed into separate modules. The operation of the radio transmission block 415 may be supported and controlled by processing circuitry 470 comprising one or more processors and memory storage, said memory storage comprising data and instructions executable by said one or more processors.

The receiving circuitry 410 comprises evaluating means 480 for evaluating a plurality of control channel message candidates 474. Said control channel message candidates 474 is stored in a memory 472 which is readable by the processing circuitry 470.

Each control channel message candidate is associated with one DMRS candidate of a set of DMRS candidates 476. A DMRS candidate may be associated to one or more control channel message candidates. A DMRS candidate comprises a plurality of PRB indicators and one DMRS sequence identifier. A PRB indicator is an index that identifies a physical resource block in a sub-frame in the time-frequency grid. The DMRS sequence identifier is used for calculating a DMRS sequence.

The receiving circuitry 410 is therefor provided with a calculator 420 configured to calculate a DMRS sequence based on the DMRS sequence identifier. If a UE is pre-configured with two sets of parameters, a UE could be provided with one identifier from each set. A first set of parameters provide a first DMRS sequence identifier for calculating a first DMRS candidate, which is associated with a first group of PRBs identified by their indicators. A second set of parameters provide a second DMRS identifier for calculating a second DMRS sequence, which is associated with a second group of PRBs identified by second set of indicators. Said first and second groups of PRBs may be totally similar, or partly similar, or totally different.

If the groups of PRBs are similar or partly similar, the groups are overlapping.

The receiving 410 circuitry further comprises an extractor 430, which is adapted to extract a signal sequence from the received signal using the plurality of PRB indicators of the first DMRS candidate.

A quality measure computation block 440 is adapted to compute one first quality measure for each DMRS candidate based on the extracted signal sequence and the calculated DMRS sequence.

An evaluation control 450 is configured to control a decoder 460 which performs an evaluation of the plurality of control channel message candidates. It selects based on said first quality measure at least one control channel message candidate for decoding of a received control channel message.

According to one embodiment of the receiving circuitry, the evaluation control 450 is configured to compare a first quality measure with a pre-set threshold value T for determining if a threshold criterion is fulfilled, and to select the control channel message candidates associated with the demodulation reference signal candidate or candidates for the evaluation for which the threshold criterion is fulfilled.

If the power of the interpolated channel estimates is higher than the residuals scaled by an appropriate scaling factor, then the DMRS are considered as detected, i.e.

$$C_i = \frac{\hat{P}}{\hat{\sigma}^2} > T$$

This threshold T, is a design variable which should be selected with care. If a high threshold is selected, then the rate of missed DMRS detections will be high. On the other side, if the threshold is selected low, the rate of false detected DMRS sequences will be high. Theoretical calculations of false detection and missed detection rates, under assumptions of a simple radio channels and additive white Gaussian noise can be used as guidelines of how to select the threshold T.

According to another embodiment, the calculator 420 is configured to calculate a DMRS sequence based on the DMRS sequence identifier of a second DMRS candidate and the extractor 430 is adapted to extract a signal sequence from the received signal using the plurality of PRB indicators of the second DMRS candidate. The quality measure computation block 440 is adapted to compute one second quality measure for the second DMRS candidate based on the extracted signal sequence and the calculated DMRS sequence. The evaluation control 450 is configured to control a decoding of the plurality of control channel message candidates by selecting based on said first quality measure at least one control channel message candidate for decoding of a received control channel message.

According to further one embodiment of the receiving, the evaluation control 450 is configured to select based on said first quality measure and the second quality measure at least one control channel message candidate for decoding of a received control channel message, wherein the at least one control channel message candidate is associated with the demodulation reference signal candidate corresponding to the quality measure being most favourable according to a pre-set criterion.

According to further another embodiment, the evaluation control 450 is configured to compare each quality measure with a pre-set threshold value for determining if a threshold criterion is fulfilled, and select the control channel message candidates associated with the demodulation reference signal candidate or candidates for the evaluation for which the threshold criterion is fulfilled.

In addition, there is an embodiment of the evaluation control 450 that is configured to compare a number of computed quality measures associated with different DMRS candidates to determine the order of the evaluation of control channel message candidates.

The DMRS candidates may be configured in the receiving circuitry 410 using a network interface. The interface 405 is adapted to receive a downlink signal 350, which when processed by the receiving circuitry is able to calculate the DMRS candidates.

The DMRS candidates may be a part of an enhanced physical downlink control channel (ePDCCH) set configuration 476.

The evaluation means 480 being configured to evaluate a plurality of control channel message candidates may be implemented in digital electronic circuitry, or in computer hardware, firmware, software, or in combinations of them. The evaluation means 480 may alternatively be implemented in a computer program product tangibly embodied in a machine readable storage device for execution by a programmable processor, e.g. the processing circuitry 470; and method steps of the evaluation method may be performed by a programmable processor, e.g. the processing circuitry 470, executing a program of instructions to perform functions of the evaluation method S100 by operating on input data and generating output.

The evaluation means 480 and evaluation method S100 may advantageously be implemented in one or more computer programs that are executable on a programmable system including at least one programmable processor, e.g. the processing circuitry 470, coupled to receive data and instructions from, and to transmit data and instructions to, a data storage system, at least one input device 405, and at least one output device 405. Each computer program may be implemented in a high-level procedural or object-oriented programming language, or in assembly or machine language if desired; and in any case, the language may be a compiled or interpreted language.

Generally, a processor, as the processing circuitry 470, will receive instructions and data from a read-only memory and/or a random access memory. Storage devices 472 suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially— designed ASICs (Application Specific Integrated Circuits).

A number of embodiments of the present methods and circuitry have been described. It will be understood that various modifications may be made without departing from the scope defined by the following claims.

The invention claimed is:
1. A method for reducing the number of decodes to be tested in a blind decode processing in a receiver circuitry, which is adapted to receive from a wireless network system enhanced Physical Downlink Control Channel (ePDCCH) demodulation reference signals (DMRS) and encoded control channel messages mapped to a plurality of physical resource blocks, PRBs, the receiver circuitry being configured to evaluate a plurality of control channel message candidates, each control channel message candidate being associated with one control channel DMRS candidate of a set of control channel DMRS candidates, a control channel DMRS candidate comprising a plurality of PRB indicators and one DMRS sequence identifier, wherein the method comprises:
  receiving a signal from the wireless network system;
  calculating a first DMRS sequence based on the DMRS sequence identifier of a first control channel DMRS candidate;
  extracting a first signal sequence from the received signal using the plurality of PRB indicators of the first control channel DMRS candidate;
  computing one first quality measure for the first control channel DMRS candidate based on the extracted first signal sequence and the calculated first DMRS sequence,
  wherein the method further comprises:
    calculating a second DMRS sequence based on the DMRS sequence identifier of a second control channel DMRS candidate;
    extracting a second signal sequence from the received signal using the plurality of PRB indicators of the second control channel DMRS candidate;
    computing one second quality measure for the second control channel DMRS candidate based on the extracted second signal sequence and the calculated second DMRS sequence; and
    controlling a decoding of the plurality of control channel message candidates by selecting based on said first quality measure and the second quality measure at least one control channel message candidate for decoding of a received control channel message, wherein the method further comprises:
computing the quality measure $C_i$ by means of a function of interpolated channel estimates $H_i^r(k,i)$ and residuals $R^r(m,i)$, wherein the residuals are produced as the difference between raw channel estimates and the interpolated channel estimates,
wherein index i represents set of estimates belonging to different parameter set configurations, represented as 0, 1 indices,
wherein index k denotes index of channel estimate in the set of PRBs in question, index k corresponding to a specific position on the resource element grid,
wherein index m denotes index of residuals in the set of PRBs in question, represented as 0, (M−1), where M corresponds to different reference signals resource elements, or groups of reference signal resource elements,
wherein the interpolated channel estimates represent the channel estimates that are produced using interpolation between two or more raw channel estimates, and
wherein the raw channel estimates represent the channel estimates that are computed by de-rotating the received reference signal data.

2. The method according to claim 1, wherein the controlling of the decoding of the plurality of control channel message candidates comprises:
selecting based on said first quality measure and the second quality measure at least one control channel message candidate for decoding of a received control channel message associated with the control channel DMRS candidate corresponding to the quality measure being most favourable according to a pre-set criterion.

3. The method according to claim 1, wherein the controlling of the decoding of the plurality of control channel message candidates comprises:
comparing each quality measure with a pre-set threshold value for determining if a threshold criterion is fulfilled; and
selecting the control channel message candidates associated with the control channel DMRS candidate or candidates for the evaluation for which the threshold criterion is fulfilled.

4. The method according to claim 1, wherein controlling of the decoding of the plurality of control channel message candidates comprises:
comparing a number of computed quality measures associated with different reference signal candidates to determine the order of the evaluation of control channel message candidates.

5. The method according to claim 1, wherein the control channel DMRS candidates are configured on the user equipment using a network interface.

6. The method according to claim 1, wherein the control channel DMRS candidates are part of an enhanced physical downlink control channel set configuration.

7. A method for reducing the number of decodes to be tested in a blind decode processing in a receiver circuitry, which is adapted to receive from a wireless network system enhanced Physical Downlink Control Channel (ePDCCH) demodulation reference signals (DMRS) and encoded control channel messages mapped to a plurality of physical resource blocks, PRBs, the method comprises an evaluation of a plurality of control channel message candidates, each control channel message candidate being associated with one control channel DMRS candidate of a set of control channel DMRS candidates, a control channel DMRS candidate comprising a plurality of PRB indicators and one DMRS identifier, wherein the method comprises:
receiving a signal from the wireless network system;
calculating a DMRS sequence based on the DMRS sequence identifier of a first control channel DMRS candidate;
extracting a signal sequence from the received signal using the plurality of PRB indicators of the first control channel DMRS candidate;
computing one first quality measure for the first control channel DMRS candidate based on the extracted signal sequence and the calculated DMRS sequence;
controlling of a decoding of the plurality of control channel message candidates comprises comparing the first quality measure with a preset threshold value for determining if a threshold criterion is fulfilled; and
selecting the control channel message candidates associated with the demodulation reference signal candidate or candidates for the evaluation for which the threshold criterion is fulfilled,
wherein the method further comprises:
computing the quality measure by means of a function of interpolated channel estimates $H_i^r(k,i)$ and residuals $(R^r(m,i))$, wherein the residuals are produced as the difference between raw channel estimates and the interpolated channel estimates,
wherein index k denotes index of channel estimate in the set of PRBs in question, index k corresponding to a specific position on the resource element grid,
wherein the interpolated channel estimates represent the channel estimates that are produced using interpolation between two or more raw channel estimates, and
wherein the raw channel estimates represent the channel estimates that are computed by de-rotating the received reference signal data.

8. A receiving circuitry configured for reducing the number of decodes to be tested in a blind decode processing, which is adapted to receive from a wireless network system enhanced Physical Downlink Control Channel (ePDCCH) demodulation reference signals (DMRS) and encoded control channel messages mapped to a plurality of physical resource blocks, PRBs, the receiving circuitry being configured to evaluate a plurality of control channel message candidates, each control channel message candidate being associated with one control channel DMRS candidate of a set of control channel DMRS candidates, a control channel DMRS candidate comprising a plurality of PRB indicators and one DMRS sequence identifier, wherein the receiving circuitry is configured to receive a signal from the wireless network system, the receiving circuitry comprises:
a calculator configured to calculate a DMRS sequence based on the DMRS sequence identifier of a first control channel DMRS candidate;
an extractor adapted to extract a signal sequence from the received signal using the plurality of PRB indicators of the first control channel DMRS candidate;
a quality measure computation block adapted to compute one first quality measure for the first control channel DMRS candidate based on the extracted signal sequence and the calculated DMRS sequence, wherein the calculator is configured to calculate a DMRS sequence based on the DMRS sequence identifier of a second control channel DMRS candidate, the extractor is adapted to extract a signal sequence from the received signal using the plurality of PRB indicators of the second control channel DMRS candidate, the quality measure computation block is adapted to compute one second quality measure for the second control channel DMRS candidate based on the extracted signal sequence and the calculated DMRS sequence; and an evaluation control configured to control an evaluation of the plurality of control channel message candidates by selecting based on said first quality measure and the second quality measure at least one control channel message candidate for decoding of a received control channel message, wherein the receiving circuitry further comprises a processing device and computer software, which is configured to compute a quality measure $C_i$ that is a function of interpolated channel estimates ($H_i^r(k,i)$) and residuals ($R^r(m,i)$), wherein the residuals are produced as the difference between raw channel estimates and the interpolated channel estimates, wherein index i represents set of estimates belonging to different parameter set configurations, represented as 0, 1 indices, wherein index k denotes index of channel estimate in the set of PRBs in question, index k corresponding to a specific position on the resource element grid, wherein index m denotes index of residuals in the set of PRBs in question, represented as 0, (M−1), where M corresponds to different reference signals resource elements, or groups of reference signal resource elements, wherein the interpolated channel estimates represent the channel estimates that are produced using interpolation between two or more raw channel estimates, and wherein the raw channel estimates represent the channel estimates that are computed by de-rotating the received reference signal data.

9. The receiving circuitry according to claim 8, wherein the evaluation control is configured to select based on said first quality measure and the second quality measure at least one control channel message candidate for decoding of a received control channel message, wherein the at least one control channel message candidate is associated with the demodulation reference signal candidate corresponding to the quality measure being most favourable according to a pre-set criterion.

10. The receiving circuitry according to claim 8, wherein the evaluation control is configured to compare each quality measure with a preset threshold value for determining if a threshold criterion is fulfilled, and select the control channel message candidates associated with the control channel DMRS candidate or candidates for the evaluation for which the threshold criterion is fulfilled.

11. The receiving circuitry according to claim 8, wherein the evaluation control is configured to compare a number of computed quality measures associated with different control channel DMRS candidates to determine the order of the evaluation of control channel message candidates.

12. The receiving circuitry according to claim 8, wherein the control channel DMRS candidates are configured in the receiving circuitry using a network interface.

13. The receiving circuitry according to claim 8, wherein the control channel DMRS candidates are part of an enhanced physical downlink control channel set configuration.

14. A receiving circuitry configured for reducing the number of decodes to be tested in a blind decode processing, which is adapted to receive from a wireless network system enhanced Physical Downlink Control Channel (ePDCCH) demodulation reference signals (DMRS) and encoded control channel messages mapped to a plurality of physical resource blocks, PRBs, the receiving circuitry being configured to evaluate a plurality of control channel message candidates, each control channel message candidate being associated with one control channel DMRS candidate of a set of control channel DMRS candidates, a control channel DMRS candidate comprising a plurality of physical resource block indicators and one DMRS sequence identifier, wherein the receiving circuitry is configured to receive a signal from the wireless network system, the receiving circuitry comprises:

a calculator configured to calculate a DMRS sequence based on the DMRS sequence identifier of a first control channel DMRS candidate;

an extractor adapted to extract a signal sequence from the received signal using the plurality of PRB indicators of the first control channel DMRS candidate;

a quality measure computation block adapted to compute one first quality measure for the first control channel DMRS candidate based on the extracted signal sequence and the calculated DMRS sequence; and an evaluation control configured to compare the first quality measure with a pre-set threshold value for determining if a threshold criterion is fulfilled, and to select the control channel message candidates associated with the control channel DMRS candidate or candidates for the evaluation for which the threshold criterion is fulfilled, wherein the receiving circuitry further comprises a processing device and computer software, which is configured to compute a quality measure $C_i$ that is a function of interpolated channel estimates ($H_i^r(k,i)$) and residuals ($R^r(m,i)$), wherein the residuals are produced as the difference between raw channel estimates and the interpolated channel estimates, wherein index i represents set of estimates belonging to different parameter set configurations, represented as 0, 1 indices, wherein index k denotes index of channel estimate in the set of PRBs in question, index k corresponding to a specific position on the resource element grid, wherein index m denotes index of residuals in the set of PRBs in question, represented as 0, (M−1), where M corresponds to different reference signals resource elements, or groups of reference signal resource elements, wherein the interpolated channel estimates represent the channel estimates that are produced using interpolation between two or more raw channel estimates, and wherein the raw channel estimates represent the channel estimates that are computed by de-rotating the received reference signal data.

* * * * *